April 12, 1955  P. GUSMARINO  2,705,989
PORTABLE RECEPTACLE
Filed June 9, 1952  3 Sheets-Sheet 1
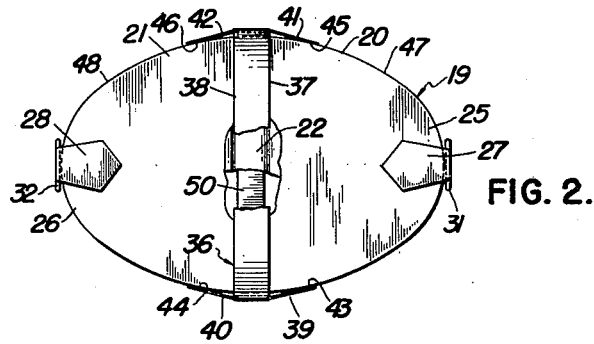
INVENTOR.
PAUL GUSMARINO.
BY
ATTORNEY April 12, 1955  P. GUSMARINO  2,705,989
PORTABLE RECEPTACLE
Filed June 9, 1952  3 Sheets-Sheet 2

INVENTOR.
PAUL GUSMARINO.
BY
ATTORNEY

April 12, 1955

P. GUSMARINO 2,705,989

PORTABLE RECEPTACLE

Filed June 9, 1952

INVENTOR.
PAUL GUSMARINO
BY
ATTORNEY

United States Patent Office 2,705,989
Patented Apr. 12, 1955

2,705,989

PORTABLE RECEPTACLE

Paul Gusmarino, Kew Gardens, N. Y.

Application June 9, 1952, Serial No. 292,533

5 Claims. (Cl. 150—46)

This invention relates to portable receptacles, particularly to ladies' handbags provided with an arm loop.

It is primarily within my contemplation to provide a receptacle of the class above mentioned with handle means serving the dual purpose of a carrying grip and a lid opener. And in this aspect of my invention it is an object thereof to enable an arm loop member to be movably manipulated so as to effect an opening and closing of a lid on the receptacle.

It is another object of my invention to present a receptacle or ladies' handbag having two independent lids providing access to different portions of the receptacle, the lids being independently movable by the manipulation of said arm loop member.

It is further within my contemplation to provide said arm loop with such a novel construction that it will be adapted to coact with the body of the receptacle and the lids thereof in such manner as to enable either or both of the lids to remain in an open position, thereby to enable access to be gained to the inner compartments and also to expose any accessories, such as a mirror or lipstick, that may be disposed on the undersides of said lids.

Other objects, features and advantages will appear from the drawings and the description hereinafter given.

Referring to the drawings,

Figure 1 is a front view of one form of my invention, with the lid sections closed, a fragment being removed for clarity.

Figure 2 is a top view of Fig. 1 with fragments of the lid sections removed for clarity.

Figure 3 is a side view of Fig. 1.

Figure 4 is a fragmentary front view of the device of Fig. 1, showing the lid in the process of being opened, a section being removed for clarity.

Figure 5 is a front view of the device of Fig. 4 showing the lid section in its fully opened position.

Figure 6 is a top view of Fig. 5.

Figure 7 is a fragmentary section of Fig. 6 taken along line 7—7.

Figure 8:
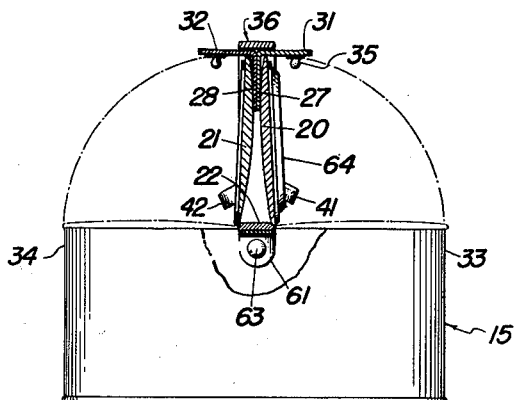
Figure 8 is a front view substantially like Fig. 1, but showing the two lid sections in their opened position, portions of this view being shown in section.

In the form of my invention illustrated in Figures 1 to 9, the casing or receptacle portion 15 comprises the generally upright laterally enclosed wall 16 and the base 17, the top open portion 18 being proportioned to receive the pivotally mounted lid member 19. Although the drawing shows the casing as a body portion of substantially elliptical cross-section, my invention is not limited to this specific configuration, other forms, such as those having circular, square, or polygonal cross-sections being employable with like force and effect within the contemplation of my invention.

The said lid member 19, in the particular form thereof illustrated, has two parts 20 and 21 pivotally connected to the fixed transverse medial portion 22 of the lid, said medial portion extending across the tops of opposite lateral wall portions 23 and 24 at the top of casing 15. At the two opposite longitudinal ends 25 and 26 of the respective lids 20 and 21 are the closure strips 27 and 28, respectively, the fixed sections 29 and 30 of the said strips being in overlying relation and secured to the top surfaces of their respective lids, the said strips being extended to form flaps 31 and 32, these being in detachable engagement with the adjacent end wall portions 33 and 34, such as by snap fasteners 35.

Pivotally mounted at the said opposite lateral wall portions 23 and 24 is the arm loop or strap 36, this being preferably of flexible semi-stiff material shaped substantially like an inverted U. Anchored to the arm loop and extending from the opposite edges 37 and 38 thereof are a pair of flexible strips 39 and 40, and an opposite pair of flexible strips 41 and 42, said strips being attached, at points spaced from the medial portion 22, to the edges 43, 44, 45 and 46 of the lid sections 20 and 21. When the said lid sections are in their closed positions, as shown in Figures 1 and 3, for example, the strips of each pair extend slopingly in divergent downward directions.

Figure 9:
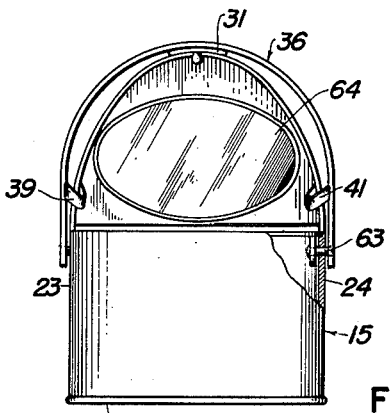
Figure 9 is a side view of Fig. 8.
Figure 12:
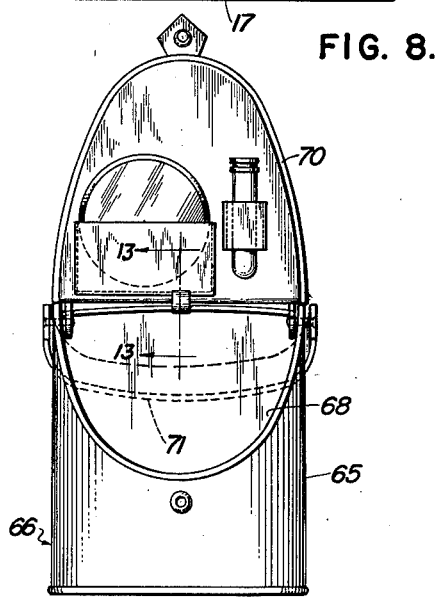
Figure 12 is a side view of Fig. 11.
Figure 11:
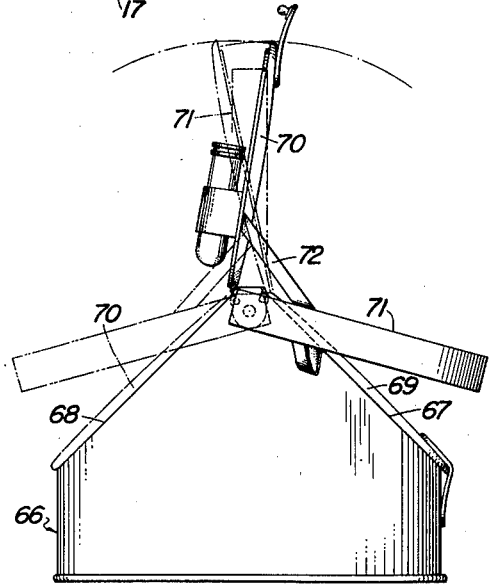
Figure 11 is a view like Fig. 10, showing in full lines open positions of one lid section and the arm loop, and in dot-dash lines the open position of the other section and the arm loop.
Figure 10:
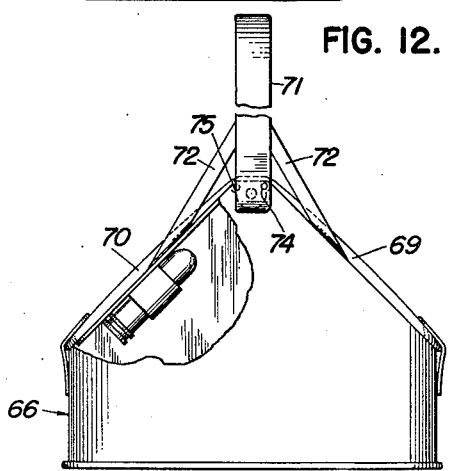
Figure 10 is a front view of a modified form of my invention, the lid sections being shown closed, a fragment being removed for clarity.
Figure 13:
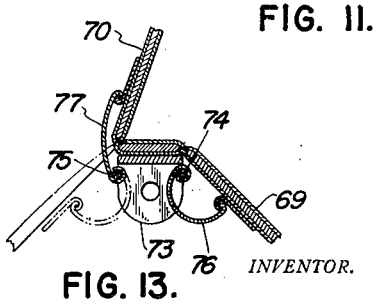
Figure 13 is a fragmentary section of Fig. 12 taken along line 13—13, the dot-dash lines indicating a closed position of one of the lid sections.

The arm loop 36 is so shaped and proportioned in relation to the lateral wall 16 of the casing and to the flaps 31 and 32 that the loop will frictionally embrace the flaps 31 and 32 when overlying the corresponding wall portions 33 and 34 when the said loop is operatively brought to a horizontal lid-opening position, such as that shown in Figure 6, as will more clearly hereinafter appear. And the peripheries 47 and 48 of the lid sections 20 and 21, respectively, are so shaped and proportioned with respect to said loop 36 and the flaps 31 and 32, that when either or both of said lid sections are brought to their respective vertical open positions, the loop will frictionally engage the said flaps attached to said lid sections to hold them in said open positions, as illustrated in Figures 8 and 9.

The said fixed medial portion 22 is shown as comprising a metal channel member 49 (see Figures 7 and 8) the transverse bar 50 of which has secured to it, by adhesives or other known securing means, several layers of material, such as the intermediate fabric sheet 51 and the upper leather sheet 52 flanking the stiffening sheet 53, and the underlying fabric sheet 54. In the particular arrangement shown, there are two additional stiffening sheets 55 and 56 for the lid sections 20 and 21, these sheets being separated by the hinge lines 57 and 58 formed by the flexible sheets 51 and 52. The lower fabric sheet 54 extends in underlying engagement with the portions of sheet 51 underlying the stiffening sheets 55 and 56 of the lid sections 20 and 21. The said lower sheet 54 has hinge portions 59 and 60 which are proportioned to be in taut condition when their respective lid sections are in predetermined open positions. Thus, by referring to Figure 7, it will be seen that when lid section 20 is in its rearwardly inclined predetermined open limiting position, it will be held against further pivotal movement downwardly by the taut hinge portion 59.

The legs 61 of said channel 49 contain apertures 62 therein through each of which extends the shank of a pivot pin 63, the opposite lower portions of the arm loop 36 being pivotally mounted upon said shanks.

The arrangement is hence such that when the loop 36 is in its upright position and the lid sections 20 and 21 closed, the handbag may be worn over the arm in conventional manner. When it is desired to gain access to one half of the receptacle, or to expose the under side of a lid section to view, such as the section carrying the mirror 64, all that need be done is to swing the loop 36 one way or the other, depending upon the requirements of the user. For example, if the loop 36 were moved in the direction of the arrow A in Figure 4, lid section 20 will be opened without interfering with the closed position of lid section 21. To hold the lid section in its fully open position, the loop is swung around to a substantially horizontal position until it envelopes the lateral wall of the casing 15 and frictionally engages the flap, such as flap 32, as illustrated in Figure 6. When the loop is released, the lid section 20 will remain in its open position until the loop is swung upwardly again. This movement is effected through the connection between the flexible strips 39, 40, 41 and 42 which are so arranged, in the manner above described, as not to interfere with the loop 36 in any of its operative positions.

Should it be desired to keep both lid sections 20 and 21 open at the same time, both sections are swung upwardly by means of the flaps 31 and 32, and brought into frictional engagement with the underside of the loop 36, as clearly illustrated in Figures 8 and 9.

Figures 10 to 13 show a somewhat modified form of my invention in which the lateral wall 65 of the casing 66 has two opposite inclined open portions 67 and 68 with which the pivotal lid sections 69 and 70 are engageable. The said lid sections are connected to the arm loop 71 by flexible strips 72, in the manner used with the form of my invention first above described. Thus, by swinging the loop 71 in opposite directions, lid sections 69 and 70 can be operatively opened, in the manner aforesaid.

In the latter form illustrated, the channel member 73 supports two pins 74 and 75 upon which are mounted the curled spring members 76 and 77 attached to the undersides of their respective lid sections 69 and 70. Said springs are so formed that when a lid section, such as section 69, is in its closed position (see Figure 13), the spring will have a considerable bow therein so as yieldably to maintain the lid in its closed position. When a section, such as 70, is opened as illustrated, the spring is swung around its pin 75 and flattened to a degree when it will hold lid section 70 in its open position past dead center. In this manner the operative opening actuation of the loop is continued until the lid section finds its open position, in the manner described.

In the form of my invention illustrated in Figures 14 to 19, a lid actuator 78 is employed in place of the flexible strips such as those identified by the reference numeral 72 connecting the arm loop with the lid sections. In the particular embodiment shown, there are two oppositely disposed actuators 78, each comprising two opposite end fingers 79 and 80 extending upwardly from the intermediate connecting portion 81 which is attached, by fastener 82, to the arm loop 83. It is preferred that the said fastener 82 have a head 84 and two separated prongs 85 extending through said loop 83 and said connecting portion 81 of the actuator, the prongs being anchored to the loop and said portion 81 to prevent relative movement between the loop and actuator. Each of the depending arms 87 of channel member 88 has an enlarged hole 86 therein in substantial registry with the hole 96 in the wall portion 97, the prongs 85 extending through and being rotatably disposed within said holes.

In the preferred construction the said fingers 79 and 80 contain cam surfaces 89 and 90, respectively, these surfaces being of convexly curved configuration and extending inwardly and downwardly from the tops of said fingers 79 and 80 to join the upper edge 91 of the said intermediate portion 81.

The arrangement is hence such that upon an operative swinging of the arm loop 83 in opposite directions, the cam surfaces 89 and 90 will engage the undersides of the corresponding lid sections 92 and 93. By referring to Figure 18, for example, a movement of arm loop 83 in the direction of arrow B will cause an upward movement of finger 79, the cam surface 89 engaging the underside 94 of lid section 92 to cause the latter to swing upwardly into an opening position. When this operation is completed by bringing the arm loop 83 around the wall portion 95, in the aforesaid manner, the said lid section 92 will be disposed in the position illustrated in Figure 19, thereby exposing the interior of the receptacle previously covered by lid section 92. Similarly, upon an operative movement of the arm loop 83 in the opposite direction, lid section 93 will be opened in obvious manner.

Figures 14, 15, 16, 17, 18, 19:
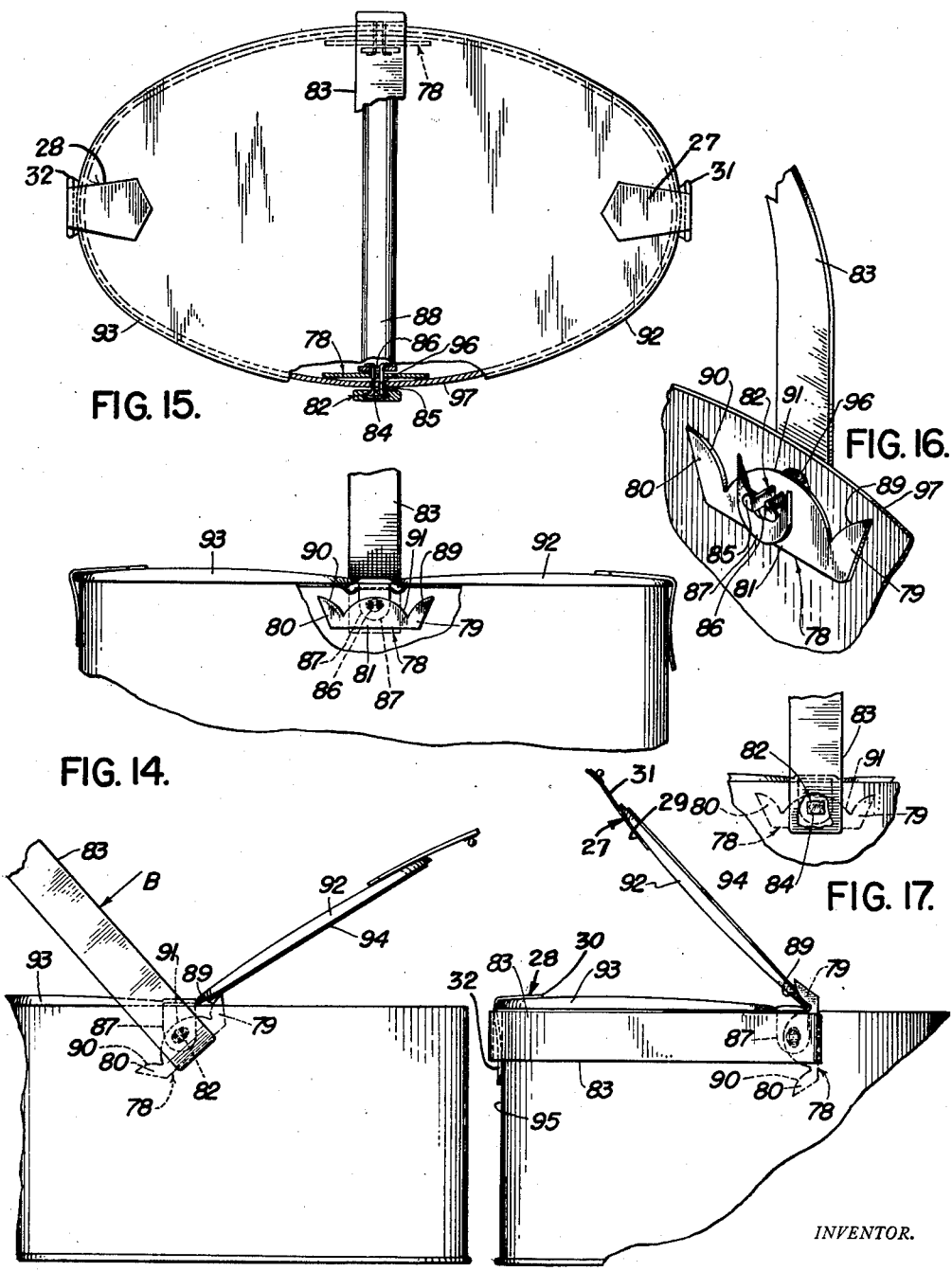
Figure 14 is a fragmentary front view of another form of my invention with the lid sections closed, a portion being removed for clarity.
Figure 15 is a top view of Fig. 14.
Figure 16 is a fragmentary enlarged perspective of the arm loop and lid actuator of the device of Figures 14 and 15.
Figure 17 is a fragmentary front view of the loop and actuator portion illustrated in Fig. 16, a fragment of the loop covering being removed.
Figure 18 is a fragmentary front view of the device of Fig. 14, showing the lid section in the process of being opened.
Figure 19 is a view substantially like Fig. 18 showing the lid section in its fully opened position.

It will be noted that the actuator 78 engages the lids in a positive manner, effecting a direct pushing action as distinguished from the pulling action such as is effected by the strips 72 hereinabove described. In the practice of my invention as illustrated in Figure 19, the intermediate portion 81 is disposed substantially in a vertical position when lid section 92 is in its predetermined fully open position. Should it be desired to close the lid section, the arm loop 83 is raised into a vertical position, whereupon the said intermediate portion 81 assumes its horizontal position shown in Figure 14. Thereupon the lid section 92 is free to move into its closing position.

It is thus apparent that with this last mentioned modification, not only is there a positive action as above explained, but the connections between the arm loop 83 and the two lid sections are invisible when the receptacle is in its fully closed position, thereby giving it an aesthetic value not present in the forms first above described. The said invisible disposition of the actuators 78 is effected by virtue of the fact that the wall 97 of the receptacle is disposed between the arm loop 83 and the actuators 78, whereby the latter members are hidden from view by the wall 95 when the lid sections are closed.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a receptacle of the class described, a casing with a lateral enclosing wall and an open portion, two coactive movable members pivotally connected to said casing, one of said members being a pivotally mounted lid for said open portion, the other of said members being an arm loop of substantially stiff material and inverted U-shaped configuration pivotally mounted on opposite portions of said casing wall, and a lid actuator member attached to said loop and operatively associated with said lid, whereby an operative movement of the said loop will movably actuate the lid, said loop being movable between an open position in which the lid is in an open position and a predetermined closed position in which the lid is in its operatively closed position, and friction holding means on one of said members remote from its pivotal connection to the casing and frictionally engageable with the other member when the lid is in said open position.

2. In a receptacle of the class described, a casing with a lateral enclosing wall and an open portion, a lid support extending across said open top portion, two lid sections pivotally mounted on said support and proportioned for closing engagement with the underlying open portion of the said casing wall, and an arm loop of substantially stiff material and inverted U-shaped configuration pivotally mounted at opposite ends of said lid support, said loop being connected to both of said lid sections, whereby operative movements of said loop in opposite directions will successively actuate said lid sections, said loop being so proportioned as to envelope peripheral portions of said lid sections, said lid sections each having at portions thereof remote from their respective pivotal connections a friction strip, said loop being in frictional engagement with said respective strips when it is in operative enveloping relation to said lid sections.

3. In a receptacle of the class described, a casing with a lateral generally upright enclosing wall and an open portion, a pivotally mounted lid for said open portion, and an arm loop of substantially inverted U-shaped configuration pivotally mounted on opposite portions of said casing wall, said loop being connected to said lid, whereby an operative movement of the said loop will movably actuate the lid, said loop being movable between an open position in which the lid is in a predetermined open position and a predetermined closed position in which the lid is in its operatively closed position, said lid having in the region of a peripheral portion thereof a closure flap adapted for detachable engagement with said lateral wall when the lid is in its closed position, said loop being proportioned to envelope and frictionally engage the said closure flap of said peripheral portion of said lid.

4. In a receptacle of the class described, a casing with a lateral generally upright enclosing wall and an open portion, a pivotally mounted lid for said open portion, and an arm loop of substantially inverted U-shaped configuration pivotally mounted on opposite portions of said casing wall, said loop being connected to said lid, whereby an operative movement of the said loop will movably actuate the lid, said loop being movable between an open position in which the lid is in a predetermined open position and a predetermined closed position in which the lid is in its operatively closed position, said lid having in the region of a peripheral portion thereof remote from its pivotal connection to the casing a closure flap adapted for detachable engagement with said lateral wall when the lid is in its closed position, said loop being proportioned to envelope and frictionally engage said closure flap when the latter is in operative engagement with the said lateral wall, whereby the lid is maintained in its said open position.

5. In a receptacle of the class described, a casing with a lateral enclosing wall and an open portion, a pivotally mounted lid for said open portion, and an arm loop of substantially stiff material and inverted U-shaped configuration pivotally mounted on opposite portions of said casing wall, and an actuator member attached to the loop adjacent its pivotal mounting and below the lid, said lid being movable between a closed position over said open portion of the said casing and open positions beyond said open portion, said actuator member having an upwardly extending finger engageable with the underside of said lid, the actuator member being movable with said loop, whereby an operative opening movement of said loop will cause the said finger to engage and lift the lid to an opening position, the said finger having a convexly arcuate cam surface extending inwardly and downwardly from the uppermost portion of the finger, said cam surface being operatively engageable with the underside of said lid.

References Cited in the file of this patent

UNITED STATES PATENTS

| | | |
|---|---|---|
| 1,036,237 | Hirsohn | Aug. 20, 1912 |
| 1,098,727 | Hirsohn | June 2, 1914 |
| 1,592,457 | Greenberg | July 13, 1926 |
| 1,831,133 | Odquist | Nov. 10, 1931 |
| 1,917,284 | Young | July 11, 1933 |